(12) United States Patent
Choi et al.

(10) Patent No.: US 9,020,251 B2
(45) Date of Patent: Apr. 28, 2015

(54) IMAGE PROCESSING APPARATUS AND METHOD

(71) Applicant: Samsung Electronics Co., Ltd., Suwon-si (KR)

(72) Inventors: Ouk Choi, Yongin (KR); Kee Chang Lee, Yongin (KR); Do Kyoon Kim, Seongnam (KR); Yong Beom Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 148 days.

(21) Appl. No.: 13/771,778

(22) Filed: Feb. 20, 2013

(65) Prior Publication Data

US 2014/0147037 A1 May 29, 2014

(30) Foreign Application Priority Data

Nov. 26, 2012 (KR) ........................ 10-2012-0134350

(51) Int. Cl.
*G06K 9/00* (2006.01)
*G06K 9/34* (2006.01)
*G06T 7/00* (2006.01)
*G06K 9/46* (2006.01)
*G06F 17/30* (2006.01)

(52) U.S. Cl.
CPC ........ *G06K 9/00362* (2013.01); *G06F 17/3025* (2013.01); *G06T 7/0081* (2013.01); *G06K 9/4652* (2013.01)

(58) Field of Classification Search
CPC ............. G06K 9/00362; G06K 9/4652; G06T 7/0081; G06F 17/3025
USPC .................................. 382/160, 164, 165, 190
See application file for complete search history.

(56) References Cited

U.S. PATENT DOCUMENTS

| | | | | |
|---|---|---|---|---|
| 7,221,809 B2 * | 5/2007 | Geng | ............................. | 382/280 |
| 8,055,061 B2 * | 11/2011 | Katano | ......................... | 382/154 |
| 8,139,067 B2 * | 3/2012 | Anguelov et al. | ............. | 345/473 |
| 8,355,568 B2 * | 1/2013 | Kang et al. | .................... | 382/164 |
| 8,537,155 B2 * | 9/2013 | Lim | .............................. | 345/420 |
| 8,700,477 B2 * | 4/2014 | Wolper et al. | ................. | 705/26.1 |
| 8,781,161 B2 * | 7/2014 | Kim et al. | ...................... | 382/103 |
| 2011/0148865 A1 | 6/2011 | Lim et al. | | |

FOREIGN PATENT DOCUMENTS

| | | |
|---|---|---|
| JP | 2012-3293 | 1/2012 |
| KR | 10-2011-0070736 | 6/2011 |
| KR | 10-1072944 | 10/2011 |
| KR | 10-2011-0131947 | 12/2011 |
| KR | 10-2012-0072128 | 7/2012 |

* cited by examiner

*Primary Examiner* — Kanjibhai Patel
(74) *Attorney, Agent, or Firm* — NSIP Law

(57) ABSTRACT

Provided is a method and apparatus for modeling a human body using a depth image and a color image. An image processing apparatus may extract a body area from a color image based on a depth value of a depth image, may match a boundary of the extracted body area and a boundary of a generic body mesh model, and may deform a mesh of the generic body mesh model based on a depth value of a pixel positioned within the boundary of the extracted body area.

18 Claims, 9 Drawing Sheets

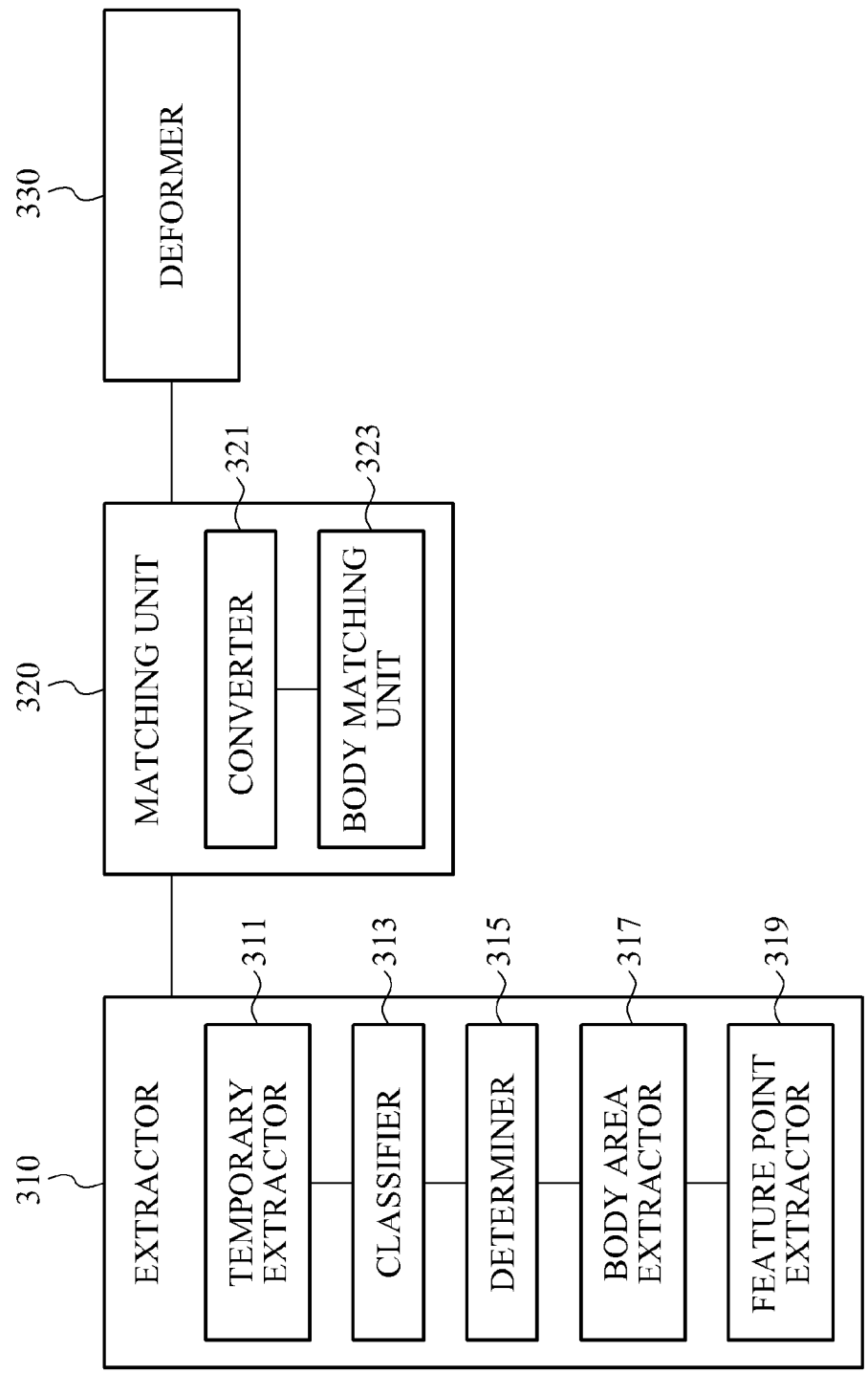

410

420

421
423
425

IMAGE PROCESSING APPARATUS AND METHOD

CROSS-REFERENCE TO RELATED APPLICATION

This application claims the priority benefit of Korean Patent Application No. 10-2012-0134350, filed on Nov. 26, 2012, in the Korean Intellectual Property Office, the disclosure of which is incorporated herein by reference.

BACKGROUND

1. Field

One or more embodiments relate to a method and apparatus for modeling a human body using a depth image and a color image.

2. Description of the Related Art

With development in facial recognition and three-dimensional (3D) measurement technology, many technologies of automatically recognizing a facial position of a person in an image and generating a precise and animatable 3D facial model have been developed.

Compared to the above technology, development of human body modeling technology has not greatly advanced since a body has a relatively small number of recognizable features compared to a face. Accordingly, development of technology of generating an animatable 3D body model has been delayed.

SUMMARY

The foregoing and/or other aspects are achieved by providing an image processing apparatus, including: an extractor to extract a body area from a color image based on a depth value of a depth image; a matching unit to match a boundary of the extracted body area and a boundary of a generic body mesh model; and a deformer to deform a mesh of the generic body mesh model based on a depth value of a pixel positioned within the boundary of the extracted body area.

The extractor may include: a temporary extractor to extract a temporary body area from the color image based on the depth value of the depth image; a classifier to classify the temporary body area into a foreground area, a background area, and an uncertain area based on the depth value; and a determiner to determine and reclassify a pixel included in the uncertain area as a pixel included in one of the foreground area and the background area, based on a color value of the color image.

The determiner may perform the determination using a grab-cut algorithm.

The extractor may include: a temporary extractor to extract a temporary body area from the color image based on the depth value of the depth image; and a body area extractor to extract, as the body area, an area in which an area estimated as a head, an area estimated as a hand, and an area estimated as a foot are removed from the temporary body area. In the to case of setting, as a neck, a point at which a horizontal length corresponding to a width of the temporary body area is absolutely short or is relatively shorter than an upper portion or a lower portion thereof, the area estimated as the head may be an area corresponding to an upper portion of the neck, the area estimated as the hand may correspond to an end based on a first boundary between the hand and an arm that is obtained based on a color value difference of the color image, and the area estimated as the foot may correspond to an end based on a second boundary between a leg and the foot that is obtained based on a color value difference of the color image.

The extractor may further include a feature point extractor to extract, as a feature point, at least one of both end points of the area estimated as the neck, both end points of the first boundary, both end points of the second boundary, and points of an armpit portion. The matching unit may perform matching using the extracted feature point. The points of the armpit portion may be detected based on a curvature calculation. The matching unit may include: a converter to generate a two-dimensional (2D) body mesh model by projecting the generic body mesh model; and a body matching unit to match points of the 2D body mesh model to the boundary of the extracted body area while maintaining topology between the points of the 2D body mesh model.

The body matching unit may match a feature point extracted from the boundary of the extracted body area and a feature point of the 2D body mesh model.

The deformer may match a depth value within the boundary of the extracted body area and vertices of a 2D body mesh model, and may deform a mesh of the 2D body mesh model.

The deformer may deform the mesh of the 2D body mesh model while maintaining topology between vertices of the 2D body mesh model.

The foregoing and/or other aspects are achieved by providing an image processing method, including: extracting a body area from a color image based on a depth value of a to depth image; matching a boundary of the extracted body area and a boundary of a generic body mesh model; and deforming a mesh of the generic body mesh model based on a depth value of a pixel positioned within the boundary of the extracted body area.

The extracting may include: extracting a temporary body area from the color image based on the depth value of the depth image; classifying the temporary body area into a foreground area, a background area, and an uncertain area based on the depth value; and determining and reclassifying a pixel included in the uncertain area as a pixel included in one of the foreground area and the background area, based on a color value of the color image.

The extracting may include: extracting a temporary body area from the color image based on the depth value of the depth image; in the case of setting, as a neck, a point at which a horizontal length corresponding to a width of the temporary body area is absolutely short or is relatively shorter than an upper portion or a lower portion thereof, estimating, as a head, an area corresponding to an upper portion of the neck; obtaining a first boundary between the hand and an arm based on a color value difference of the color image, and estimating, as a hand, an end based on the first boundary; obtaining a second boundary between a leg and the foot based on a color value difference of the color image, and estimating, as a foot, an end based on the second boundary; and extracting, as the body area, an area in which the area estimated as the head, the area estimated as the hand, and the area estimated as the foot are removed from the temporary body area.

The extracting may further include extracting, as a feature point, at least one of both end points of the area estimated as the neck, both end points of the first boundary, both end points of the second boundary, and points of an armpit portion, and the matching may include performing matching using the extracted feature point.

The matching may include: generating a 2D body mesh model by projecting the generic body mesh model; and matching points of the 2D body mesh model to the boundary of the extracted body area while maintaining topology between the points of the 2D body to mesh model.

The matching of the points may include matching a feature point extracted from the boundary of the extracted body area and a feature point of the 2D body mesh model.

The deforming may include matching a depth value within the boundary of the extracted body area and vertices of a 2D body mesh model, and deforming a mesh of the 2D body mesh model.

The deforming may include deforming the mesh of the 2D body mesh model while maintaining topology between vertices of the 2D body mesh model.

Additional aspects of embodiments will be set forth in part in the description which follows and, in part, will be apparent from the description, or may be learned by practice of the disclosure.

BRIEF DESCRIPTION OF THE DRAWINGS

These and/or other aspects will become apparent and more readily appreciated from the following description of embodiments, taken in conjunction with the accompanying drawings of which:

FIG. 3 illustrates an image processing apparatus according to another embodiment;

DETAILED DESCRIPTION

Figure 1:
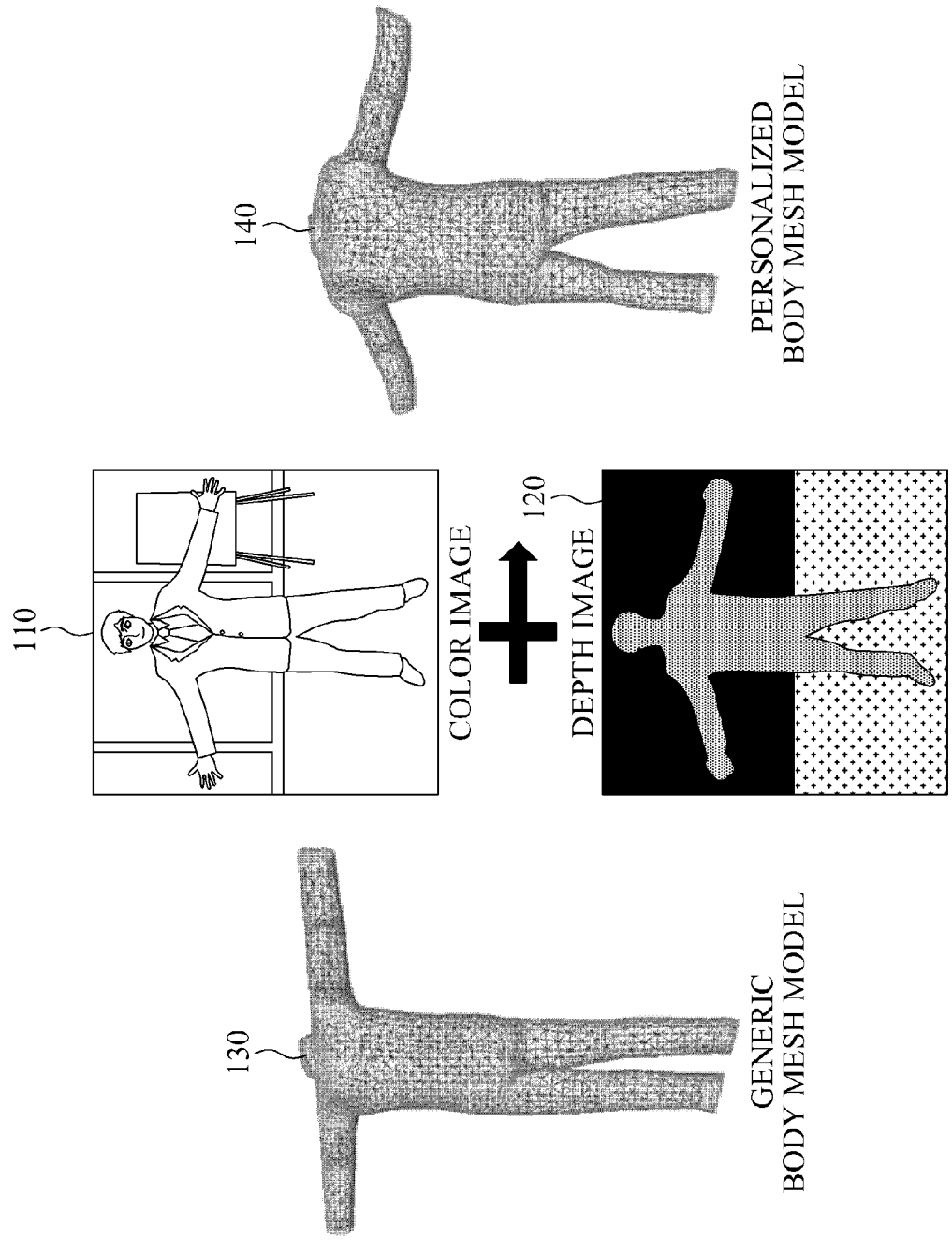
FIG. 1 illustrates a concept of an image processing apparatus to generate a personalized three-dimensional (3D) body mesh model according to an embodiment.

Reference will now be made in detail to embodiments, examples of which are illustrated in the accompanying drawings, wherein like reference numerals refer to the like elements throughout. Embodiments are described below to explain the present disclosure by referring to the figures.

The terminology "two-dimensional (2D) body mesh model used herein may indicate the same target as a 2D generic body mesh model throughout the present specification.

FIG. 1 illustrates a concept of an image processing apparatus to generate a personalized 3D body mesh model according to an embodiment.

The image processing apparatus may receive a pair of a color image 110 and a depth image 120. The pair of the color image 110 and the depth image 120 may refer to the color image 110 and the depth image 120 that are photographed using at least one of an identical time and an identical photographing angle.

The image processing apparatus may extract a body area from the color image 110 based on a depth value of the depth image 120. Here, extraction may indicate segmentation used in a computer vision field.

The image processing apparatus may extract a feature point from a boundary of the extracted body area. Feature points may include both end points of an area estimated as a neck of a person, both end points of a portion that connects a hand and an arm, both end points of a portion that connects a foot and a leg, points of an armpit portion, a point of a portion that connects a left leg and a right leg, and the like.

To match the extracted feature point and a feature point of a 3D generic body mesh model 130, the image processing apparatus may generate a 2D generic body mesh model by projecting the 3D generic body mesh model 130.

To match a feature point of the 2D generic body mesh model and the feature point extracted from the boundary of the extracted body area, the image processing apparatus may match the 2D generic body mesh model and the boundary of the extracted body area.

Also, to simultaneously match the 2D generic mesh model and a shape of a body while maintaining the matched boundary, the image processing apparatus may generate a personalized body mesh model 140 that matches the extracted body area by three-dimensionally deforming a mesh of the 2D generic body mesh model.

Figure 2:
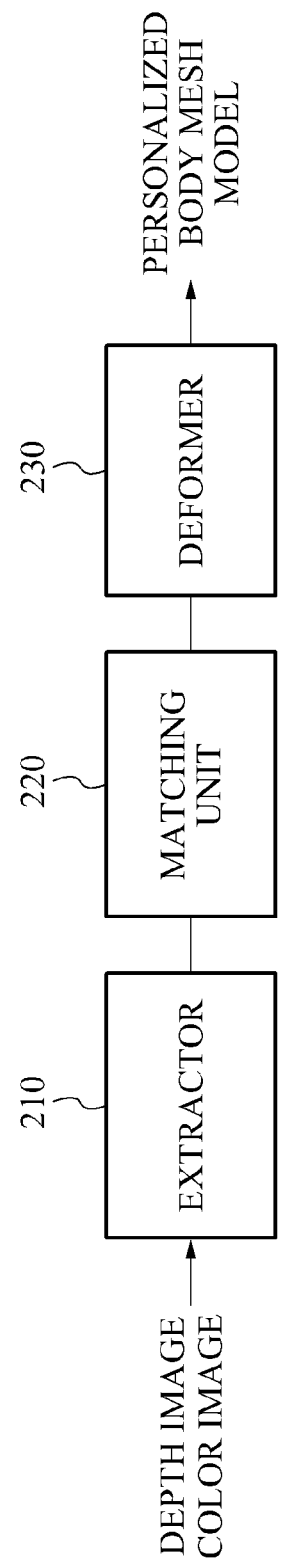
FIG. 2 illustrates an image processing apparatus according to an embodiment.

FIG. 2 illustrates an image processing apparatus according to an embodiment.

Referring to FIG. 2, the image processing apparatus may include an extractor 210, a matching unit 220, and a deformer 230.

The extractor 210 may extract a body area from a color image based on a depth value of a depth image. In this example, extraction may indicate segmentation used in a computer vision field. The extractor 210 may extract the body area from the color image based on a difference between a depth value of the body area and a depth value of an area excluding the body area. The extractor 210 may more precisely separate a boundary of the body area using a grab-cut algorithm.

The extractor 210 may initially extract a temporary body area from the color image based on the depth value of the depth image. The extractor 210 may extract, as the body area, an area in which an area estimated as a head, an area estimated as a hand, and an area estimated as a foot are removed from the temporary body area. A head area, a hand area, and a foot area may be excluded from a generic body mesh model to be matched.

The extractor 210 may remove the area estimated as the head by detecting a neck portion in the temporary body area. In the case as setting, as a neck, a point at which a horizontal length corresponding to a width of the temporary body area is absolutely short or is relatively shorter than an upper portion or a lower portion thereof, the extractor 210 may estimate, as a head area, an area corresponding to an upper portion of the neck.

The extractor 210 may identify the hand area based on a color value difference between the hand and an arm, and may remove the hand area from the temporary body area. The extractor 210 may obtain a first boundary between the hand and the arm based on a color value difference of the color image, and may estimate, as the hand area, an area corresponding to an end based on the first boundary.

The extractor 210 may identify the foot area based on a color value difference between the foot and a leg, and may remove the foot area from the temporary body area. The extractor 210 may obtain a second boundary between the leg and the foot based on a color value difference of the color image, and may estimate, as the foot area, an area corresponding to an end based on the second boundary.

A generic body mesh model is a model configured using a plurality of meshes based on a general shape of a human body.

The matching unit 220 may match the boundary of the body area extracted by the extractor 210 and a boundary of the generic body mesh model. The matching unit 220 may generate a 2D generic body mesh model by projecting a 3D generic body mesh model. The body area extracted by the extractor 210 is 2D and thus, conversion to 2D may be required to match the generic body mesh model.

The matching unit 220 may match a feature point of the boundary of the extracted body area and a feature point of the boundary of the 2D generic body mesh model. Feature points may include both end points of an area estimated as the neck, both end points of a portion that connects the hand and the arm, points of an armpit portion, both end points of a portion that connects the foot and the leg, a point of a portion that connects both legs, and the like.

The matching unit 220 may maintain topology between points of the boundary of the 2D generic body mesh model, and may match the boundary of the body area extracted by the extractor 210 and the boundary of the 2D generic body mesh model.

The deformer 230 may deform the mesh of the generic body mesh model based on a depth value of a pixel positioned within the boundary of the extracted body area. Inside of the boundary of the body area may indicate a torso, and the depth value of the pixel may be obtained from the depth image. The deformer 230 may deform the mesh by enabling a vertex of the generic body mesh model corresponding to the pixel positioned within the boundary of the extracted body area to have the depth value of the pixel. The mesh may be generated by forming an edge between vertices and by configuring edges. Accordingly, the mesh may be deformed by giving a 3D depth value to a vertex.

The deformer 230 may deform a mesh of a 2D body mesh model by matching a depth value within the boundary of the body area extracted by the extractor 210 and vertices of the 2D body mesh model. The deformer 230 may deform the mesh while maintaining topology between vertices of the 2D body mesh model. Neighboring vertices may have a similar depth value and may also have similar edge directivity. The deformer 230 may deform the mesh by enabling the neighboring vertices to have the similar depth value and the similar edge directivity.

The deformer 230 may generate a personalized 3D body mesh model by matching depth values of vertices of the 2D body mesh model and depth values within the boundary of the body area, which differs for each person, and by deforming the mesh of the 2D body mesh model.

FIG. 3 illustrates an image processing apparatus according to another embodiment.

Referring to FIG. 3, the image processing apparatus may include an extractor 310, a matching unit 320, and a deformer 330.

The extractor 310 may include a temporary extractor 311, a classifier 313, a determiner 315, a body area extractor 317, and a feature point extractor 319.

The extractor 310 may extract a body area from a color image based on a depth value of a depth image. In this example, extraction may indicate segmentation used in a computer vision field. The extractor 310 may extract the body area from the color image based on a difference between a depth value of the body area and a depth value of an area excluding the body area. The extractor 310 may more precisely separate a boundary of the body area using a grab-cut algorithm.

The temporary extractor 311 may extract a temporary body area from the color image based on the depth value of the depth image. The temporary body area may indicate an area that requires processing in order to generate the body area to be an input of the matching unit 320.

The classifier 313 may classify the temporary body area into a foreground area, a background area, and an uncertain area based on the depth value of the depth image. Due to inaccurate calibration, for example, a slightest error may occur in the temporary body area extracted by the temporary extractor 311. Based on the range of a depth value that is set to be narrower, the classifier 313 may classify the extracted body area into the foreground area in which the body area is certain, the background area in which a background of the body area is certain, or the uncertain area in which it is uncertain whether a corresponding area corresponds to the body area or the background area.

The determiner 315 may determine and reclassify a pixel included in the uncertain area as a pixel included in one of the foreground area and the background area, based on a color value of the color image. For example, the determiner 315 may determine, as the foreground area, a pixel having a color value similar to the foreground area among pixels of the uncertain area. Alternatively, the determiner 315 may determine, as the background area, a pixel having a color value similar to the background area among pixels of the uncertain area.

The determiner 315 may determine whether a pixel included in the uncertain area belongs to the foreground area or the background area, using a grab-cut algorithm. Also, even though not described here, various segmentation schemes may be used to determine an area belonged by the pixel included in the uncertain area.

The body area extractor 317 may extract, as the body area, an area in which an area estimated as a head, an area estimated as a hand, and an area estimated as a foot are removed from the temporary body area extracted by the temporary extractor 311. A head area, a hand area, and a foot area may be removed from the temporary body area since a generic body mesh model to match the body area does not include the body area, the hand area, and the foot area.

As another example, the body area extractor 317 may extract, as the body area, an area in which the area estimated as the head, the area estimated as the hand, and the area estimated as the foot are removed from the temporary body area to which the pixel included in the uncertain area is reclassified by the determiner 315.

In the case of setting, as a neck, a point at which a horizontal length corresponding to a width of the temporary body area is absolutely short or is relatively shorter than an upper portion or a lower portion thereof, the body area extractor 317 may estimate, as a head, an area corresponding to an upper portion of the neck.

The body area extractor 317 may obtain a first boundary between the hand and an arm based on a color value difference of the color image in the temporary body area. The body area extractor 317 may estimate, as the hand, an end based on the first boundary. For example, the body area extractor 317 may obtain the first boundary between the hand and the arm based on a difference between a color value of clothes worn by a person and a color value of the hand, and may estimate, as the hand, the end based on the first boundary.

The body area extractor 317 may obtain a second boundary between a leg and a foot based on a color value difference of the color image in the temporary body area. The body area extractor 317 may estimate, as the foot, an end based on the second boundary. For example, the body area extractor 317 may obtain the second boundary between the foot and the leg based on a difference between a color value of clothes worn by the person and a color value of the foot, and may estimate, as the foot, an end based on the second boundary.

For example, the body area extractor 317 may remove a facial area, a hand area, and a foot area from the temporary body area using a grab-cut algorithm. Here, conditions applied to the grab-cut algorithm may include 1) a condition that an area corresponding to an upper portion of a neck is set as a head in the case of setting, as the neck, a point at which the horizontal length corresponding to the width of the temporary body area is absolutely short or is relatively shorter than an upper portion or a lower portion thereof in order to determine a neck portion, 2) a condition that a color value of a hand and a color value of clothes differ, and 3) a condition that a color value of a foot and a color value of clothes differ.

The feature point extractor 319 may extract, as a feature point, at least one of both end points of the area estimated as the neck, both end points of the first boundary that connects the hand and the arm, both end points of the second boundary that connects the foot and the left, and points of an armpit portion. The feature point extractor 319 may also extract, as a feature point, a point of a portion that connects a left leg and a right leg.

The extracted feature point may be used to be matched with a feature point of a generic body mesh model.

The feature point extractor 319 may detect points of the armpit portion based on curvature calculation. For example, the feature point extractor 319 may calculate a curvature from the boundary of the body area. The feature point extractor 319 may determine, as points corresponding to the armpit portion, points corresponding to the largest curvature value, and may extract the determined points as feature points.

The matching unit 320 may include a converter 321 and a body matching unit 323.

The body area extracted by the extractor 310 may be a 2D image that is extracted from the color image. Accordingly, to match the generic body mesh model and the body area, the matching unit 320 may need to two-dimensionally convert the 3D generic body mesh model.

The converter 321 may generate the 2D body mesh model by projecting the 3D generic body mesh model. The 3D generic body mesh model may include points having predetermined intervals. The converter 321 may convert coordinates of the points to 2D coordinates by projecting the coordinates of the points.

The body matching unit 323 may match points of the 2D body mesh model and the boundary of the body area while maintaining topology between the points of the 2D body mesh model. Maintaining the topology between the points of the 2D body mesh model may indicate maintaining a distance between the points and may also indicate that positions of points positioned on the left and right of each point are maintained during matching.

The body matching unit 323 may match a feature point extracted from the boundary of the body area extracted by the feature point extractor 317 and a feature point of the 2D body mesh model. The body matching unit 323 may more accurately match the boundary of the body area and a boundary of the 2D body mesh model by matching the points of the 2D body mesh model and the boundary of the body area extracted by the extractor 310 and at the same time, matching the feature point of the 2D body mesh model and the feature point of the boundary of the body area extracted by the feature point extractor 317.

The deformer 330 may deform a mesh of the generic body mesh model based on a depth value of a pixel positioned within the boundary of the body area extracted by the extractor 310. The generic body mesh model to be deformed may be a 2D generic body mesh model that matches the boundary of the extracted body area. The deformer 330 may generate a 3D generic body mesh model by deforming the mesh of the 2D generic body mesh model.

The deformer 330 may obtain, from the depth image, a depth value of a pixel positioned within the boundary of the extracted body area.

The deformer 330 may match the depth value within the boundary of the extracted body area and vertices of the 2D body mesh model, and may deform the mesh of the 2D body mesh model. As described above, the 2D body mesh model may indicate the same target as the 2D generic body mesh model.

As vertices of the 2D body mesh model become to have the depth value of the pixel positioned within the boundary, a shape of the mesh may vary. As the vertices become to have the depth value, the 2D body mesh model may be deformed to a 3D body mesh model. The 3D body mesh model may match the boundary of the extracted body area and inside of the boundary of the extracted body area and thus, may become a personalized body mesh model.

The deformer 330 may deform the mesh of the 2D body mesh model while maintaining topology between vertices of the 2D body mesh model. The deformer 330 may deform the mesh by enabling neighboring vertices to have a similar dept value and maintaining a positional relationship between the neighboring vertices. For example, the positional relationship between vertices may indicate a distance between vertices, or vertices that are positioned in front, at rear, on the right, and on the left based on a corresponding vertex.

Figure 4A:
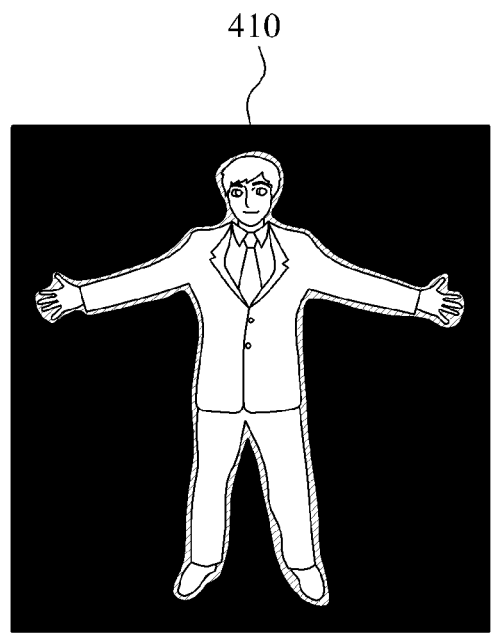
FIGS. 4A and 4B illustrate a result of extracting, by an image processing apparatus, a body area according to an embodiment.
Figure 4B:
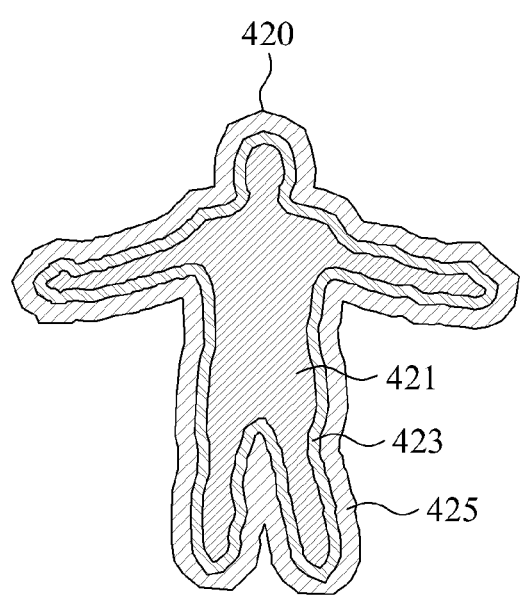

FIGS. 4A and 4B illustrate a result of extracting, by an image processing apparatus, a body area according to an embodiment.

Referring to FIGS. 4A and 4B, based on depth information of a depth image, it is possible to approximately segment a human body as shown in an image 410 obtained from a color image.

Due to inaccurate calibration, for example, a slight error may occur. To compensate for the error, the image 410 may be classified into a foreground area 421 certainly corresponding to a human body, a background area 425 that is not certainly the human body, and an uncertain area 423 in which it is uncertain whether a corresponding area corresponds to the foreground area 421 or the background area 425 as shown in an image 420 of FIG. 4B.

To determine whether pixels of the uncertain area 423 belong to the foreground area 421 or the background area 425, the image processing apparatus may employ a grab-cut algorithm that is a color based segmentation scheme and may also use another segmentation scheme.

Figure 5A:
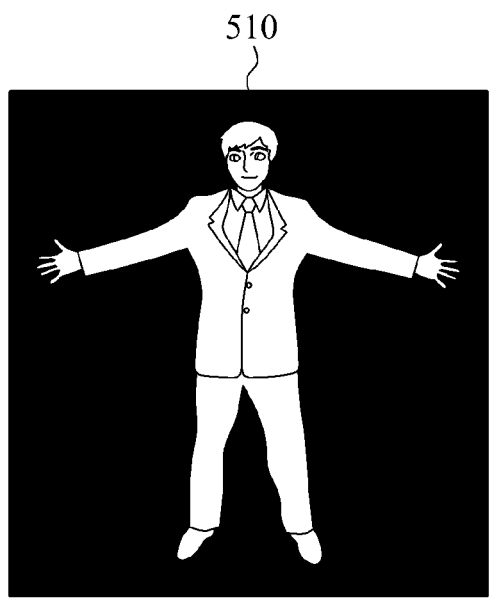
FIGS. 5A and 5B illustrate a result of removing, by an image processing apparatus, areas estimated as a head, a hand, and a foot from a body area according to an embodiment.
Figure 5B:
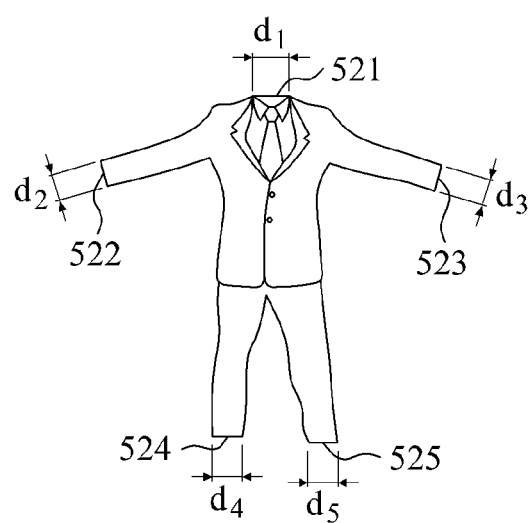

FIGS. 5A and 5B illustrate a result of removing, by an image processing apparatus, areas estimated as a head, a hand, and a foot from a body area according to an embodiment.

Referring to FIG. 5A, an image 510 may be obtained as a segmentation result using a grab-cut algorithm.

A generic body mesh model may be a mesh model in which a head area, a hand area, and a foot area are removed. Accordingly, to match the generic body mesh model and a segmented body area in the color image, there is a need to remove areas corresponding to a head, a hand, and a foot from a segmented temporary body area.

The image processing apparatus may remove an upper portion of a neck portion 521 from the temporary body area based on a condition that the neck portion 521 has a shortest length $d_1$ in a horizontal direction in a human body.

Based on a condition that portions 522 and 523 that connect hands and arms have a color value different from a color value of clothes, the image processing apparatus may remove areas corresponding to hands from the temporary body area. Here, a grab-cut algorithm may be used to identify the areas corresponding to the hands. Also, in addition to the aforementioned condition, the shortest lengths $d_2$ and $d_3$ may be applied as another condition.

Based on a condition that portions 524 and 525 that connect feet and legs have a color value different from a color value of clothes, the image processing apparatus may to remove areas corresponding to the feet from the temporary body area. Here, the grab-cut algorithm may be used to identify the areas corresponding to the feet. Also, in addition to the aforementioned condition, the shortest lengths $d_4$ and $d_5$ may be applied as another condition.

Figure 6:
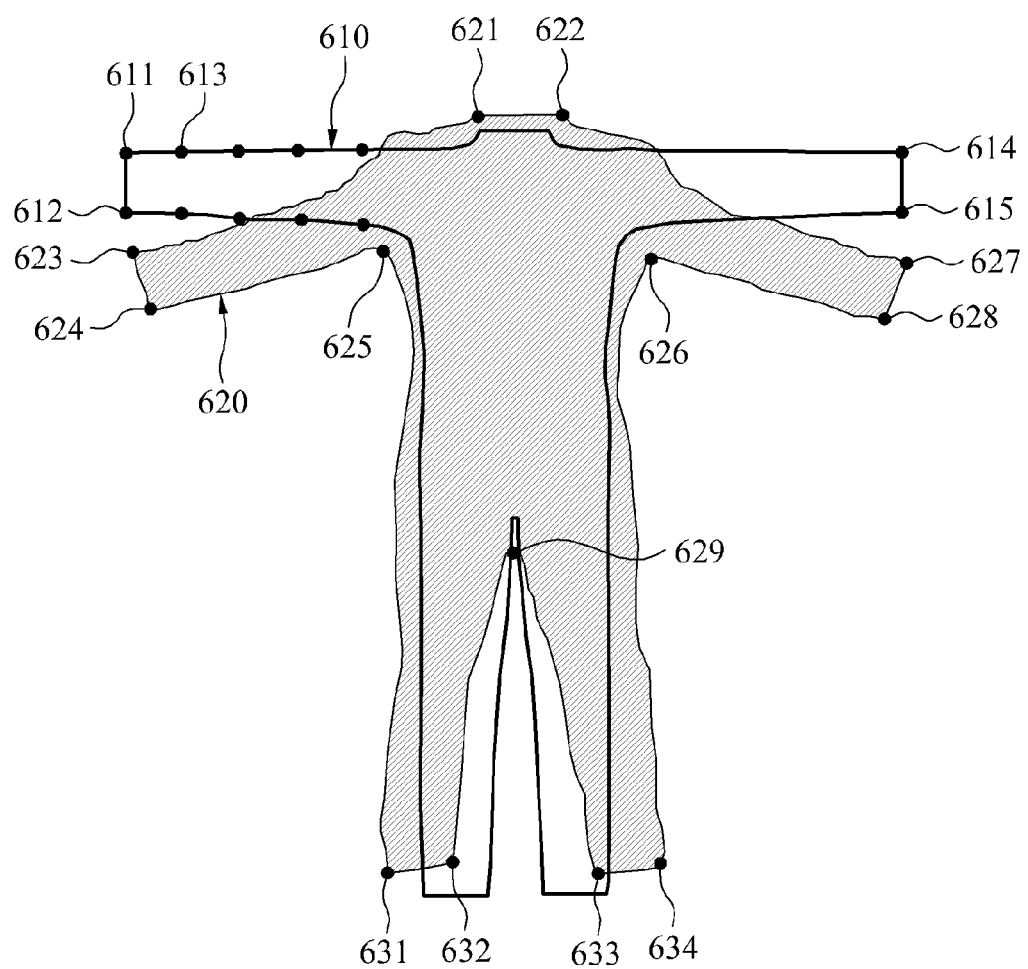
FIG. 6 illustrates a diagram to describe an operation of matching, by an image processing apparatus, a generic body mesh model and an extracted body area according to an embodiment.

FIG. 6 illustrates a diagram to describe an operation of matching, by an image processing apparatus, a generic body mesh model 610 and an extracted body area 620 according to an embodiment.

Referring to FIG. 6, the generic body mesh model 610 may be generated by projecting a 3D model. The generic body mesh model 610 may be referred to as a projected mesh model.

The image processing apparatus may extract, as a feature point, at least one of both end points 621 and 622 of an area that is estimated as a neck in the extracted body area 620, both end points 623 and 624, and 627 and 628 of first boundaries at which hands and arms meet, both end points 631 and 632, and 633 and 634 of second boundaries at which legs and feet meet, points 625 and 626 of armpit portions, and a point 629 of a portion that connects the left leg and the right leg.

3D coordinates of a feature point may be obtained from the depth image. Corresponding feature points 611, 612, 614, and 615 are also present in the generic body mesh model 610.

The image processing apparatus may match the feature points 623 and 624 of the extracted body area 620 and the feature points 611 and 612 of the generic body mesh model 610 to be identical. The image processing apparatus may match feature points through affine transformation.

All of the points 611, 612, 613, 614, and 615 of the generic body mesh model 610 may mutually maintain topology, and may be matched to be positioned on a boundary of the extracted body area 620.

As a condition to match a boundary of the extracted body area 620 and a boundary of the generic body mesh model 610, a condition that topology between points of the generic body mesh model needs to be maintained and a condition that feature points of the extracted body area 620 and feature points of the generic body mesh model 610 match may be applied.

Figure 7:
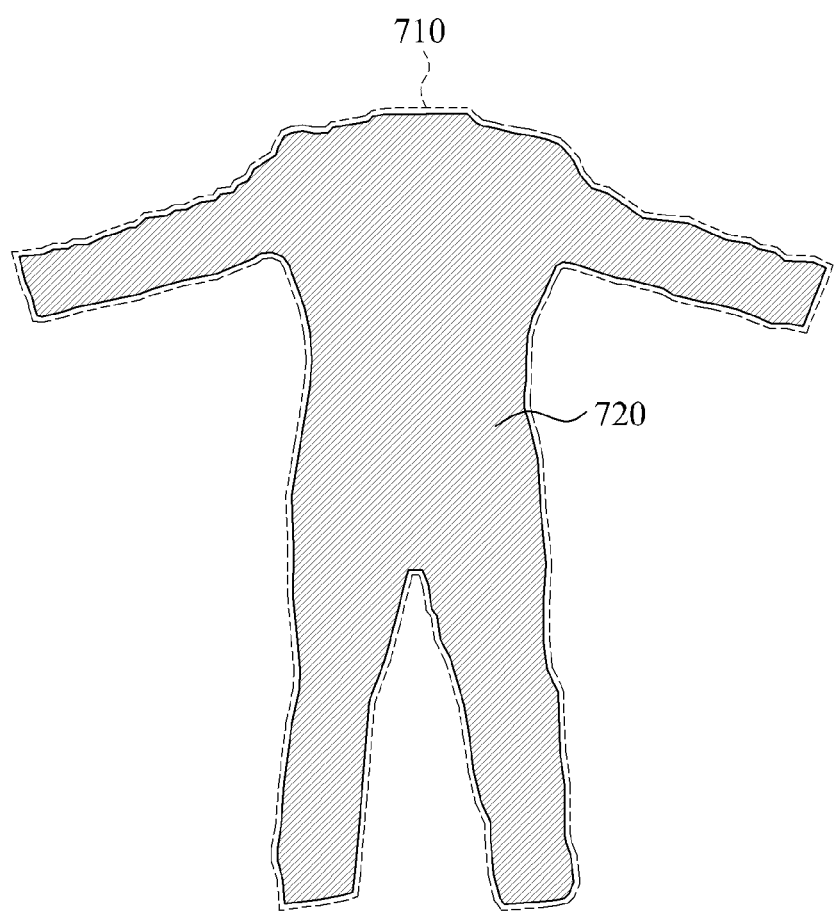
FIG. 7 illustrates a result of matching, by an image processing apparatus, a boundary of a generic body mesh model and a boundary of an extracted body area on two dimension (2D) according to an embodiment.

FIG. 7 illustrates a result of matching, by an image processing apparatus, a boundary of a generic body mesh model 710 and a boundary of an extracted body area 720 on 2D according to an embodiment.

Referring to FIG. 7, the boundary of the generic body mesh model 710 may match the boundary of the body area 720 extracted from a color image. For example, a generic body mesh model generally used may be deformed to a body model having a different shape for each person. Here, the matched generic body mesh model 710 may be a 2D body mesh model.

Figure 8:
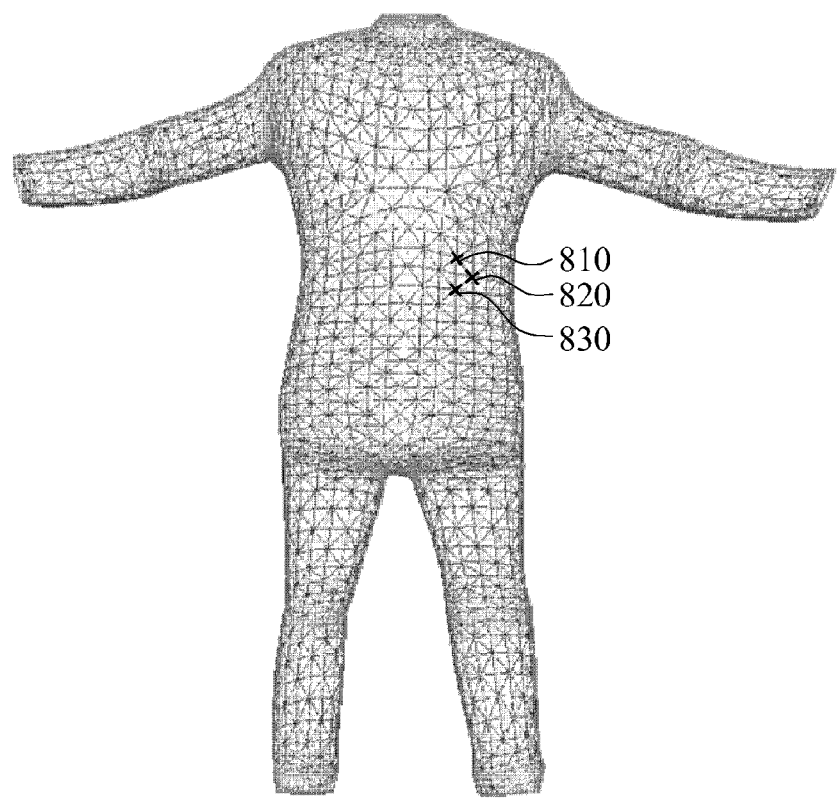
FIG. 8 illustrates a 3D body mesh model generated by an image processing apparatus according to an embodiment.

FIG. 8 illustrates a 3D body mesh model generated by an image processing apparatus according to an embodiment.

Referring to FIG. 8, the generic body mesh model 710 of FIG. 7 may be deformed to a 3D body mesh model based on a depth value of a depth image.

The image processing apparatus may be aware of a depth value and a position of each of points of the generic body mesh model 710 in a color image. The generic body mesh model 710 matches the extracted body area 720 in the color image and thus, points of the generic body mesh model 710 may match coordinate values of the color image. A coordinate value of the depth image may be estimated from a coordinate value of the color image, and a depth value corresponding to coordinates of the depth image may be estimated. When points of the generic body mesh model 710 become to have a depth value, the 3D body mesh model may be generated.

The image processing apparatus may deform the mesh so that depth values of a torso portion and depth values of vertices 810, 820, and 830 positioned on a torso of the generic body mesh model 710 may match, while maintaining depth values of vertices corresponding to feature points among points of the generic body mesh model 710.

The image processing apparatus may deform the mesh while maintaining the overall topology between the vertices 810, 820, and 830 positioned on the torso and vertices included in the generic body mesh model 710.

Figure 9:
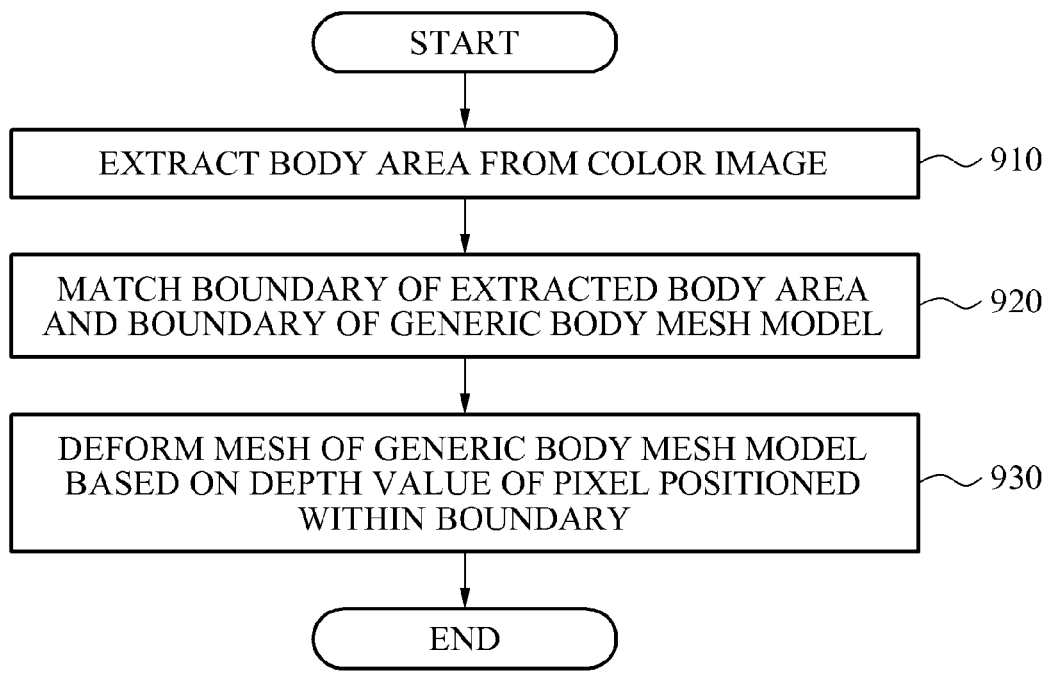
FIG. 9 illustrates a flowchart of an image processing method according to an embodiment.

FIG. 9 illustrates a flowchart of an image processing method according to an embodiment.

In operation 910, an image processing apparatus may extract a body area from a color image based on a depth value of a depth image.

The image processing apparatus may extract a temporary body area from the color image based on the depth value of the depth image, and may classify the temporary body area into a foreground area, a background area, and an uncertain area based on the depth value.

The image processing apparatus may determine and reclassify a pixel included in the uncertain area as a pixel included in one of the foreground area and the background area, based on a color value of the color image.

In the case of setting, as a neck, a point at which a horizontal length corresponding to a width of the temporary body area is absolutely short or is relatively shorter than an upper portion or a lower portion thereof, the image processing apparatus may estimate, as a head, an area corresponding to an upper portion of the neck.

The image processing apparatus may obtain a first boundary between the hand and an arm based on a color value difference of the color image, and may estimate, as a hand, an end based on the first boundary.

The image processing apparatus may obtain a second boundary between a leg and the foot based on a color value difference of the color image, and may estimate, as a foot, an end based on the second boundary.

The image processing apparatus may extract, as the body area, an area in which the areas estimated as the head, the hand, and the foot are removed from the temporary body area.

The image processing apparatus may extract, as a feature point, at least one of both end points of the area estimated as the neck, both end points of the first boundary, both end points of the second boundary, and points of an armpit portion.

In operation 920, the image processing apparatus may match a boundary of the extracted body area and a boundary of a generic body mesh model.

The image processing apparatus may generate a 2D body mesh model by projecting the generic body mesh model.

The image processing apparatus may match points of the 2D body mesh model to the boundary of the extracted body area while maintaining topology between the points of the 2D body mesh model.

The image processing apparatus may match a feature point extracted from the boundary of the extracted body area and a feature point of the 2D body mesh model.

In operation 930, the image processing apparatus may deform a mesh of the generic body mesh model based on a depth value of a pixel positioned within the boundary of the extracted body area.

The image processing apparatus may match a depth value within the boundary of the extracted body area and vertices of a 2D body mesh model, and may deform a mesh of the 2D body mesh model.

The image processing apparatus may deform deforming the mesh of the 2D body mesh model while maintaining topology between vertices of the 2D body mesh model.

According to an embodiment, the image processing apparatus may generate a 3D body mesh model deformable to be suitable for a characteristic of a person by extracting a feature point of a body from a boundary of a body area that is extracted from a color image based on a depth value of a depth image, by matching the extracted feature point and a feature point of a generic body mesh model, and by deforming a mesh of the generic body to mesh model based on a depth value within the boundary of the extracted body area.

According to an embodiment, the image processing apparatus may perform 3D modeling of a personalized human body, and may generate a human body model capable of freely deforming a face, a hand, a foot, and the like.

The image processing method according to the above-described embodiments may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM disks and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described embodiments, or vice versa.

Although embodiments have been shown and described, it would be appreciated by those skilled in the art that changes may be made in these embodiments without departing from the principles and spirit of the disclosure, the scope of which is defined by the claims and their equivalents.

What is claimed is:

1. An image processing apparatus, comprising:
    an extractor to extract a body area from a color image based on a depth value of a depth image;
    a matching unit to match a boundary of the extracted body area and a boundary of a generic body mesh model; and
    a deformer to deform a mesh of the generic body mesh model based on a depth value of a pixel positioned within the boundary of the extracted body area.

2. The image processing apparatus of claim 1, wherein the extractor comprises:
    a temporary extractor to extract a temporary body area from the color image based on the depth value of the depth image;
    a classifier to classify the temporary body area into a foreground area, a background area, and an uncertain area based on the depth value; and
    a determiner to determine and reclassify a pixel included in the uncertain area as a pixel included in one of the foreground area and the background area, based on a color value of the color image.

3. The image processing apparatus of claim 2, wherein the determiner performs the determination using a grab-cut algorithm.

4. The image processing apparatus of claim 1, wherein:
    the extractor comprises:
    a temporary extractor to extract a temporary body area from the color image based on the depth value of the depth image; and
    a body area extractor to extract, as the body area, an area in which an area estimated as a head, an area estimated as a hand, and an area estimated as a foot are removed from the temporary body area, and
    in the case of setting, as a neck, a point at which a horizontal length corresponding to a width of the temporary body area is absolutely short or is relatively shorter than an upper portion or a lower portion thereof,
    the area estimated as the head is an area corresponding to an upper portion of the neck,
    the area estimated as the hand corresponds to an end based on a first boundary between the hand and an arm that is obtained based on a color value difference of the color image, and
    the area estimated as the foot corresponds to an end based on a second boundary between a leg and the foot that is obtained based on a color value difference of the color image.

5. The image processing apparatus of claim 4, wherein:
    the extractor further comprises:
    a feature point extractor to extract, as a feature point, at least one of both end points of the area estimated as the neck, both end points of the first boundary, both end points of the second boundary, and points of an armpit portion, and
    the matching unit performs matching using the extracted feature point.

6. The image processing apparatus of claim 5, wherein the points of the armpit portion are detected based on a curvature calculation.

7. The image processing apparatus of claim 1, wherein the matching unit comprises:
    a converter to generate a two-dimensional (2D) body mesh model by projecting the generic body mesh model; and
    a body matching unit to match points of the 2D body mesh model to the boundary of the extracted body area while maintaining topology between the points of the 2D body mesh model.

8. The image processing apparatus of claim 7, wherein the body matching unit matches a feature point extracted from the boundary of the extracted body area and a feature point of the 2D body mesh model.

9. The image processing apparatus of claim 1, wherein the deformer matches a depth value within the boundary of the extracted body area and vertices of a 2D body mesh model, and deforms a mesh of the 2D body mesh model.

10. The image processing apparatus of claim 9, wherein the deformer deforms the mesh of the 2D body mesh model while maintaining topology between vertices of the 2D body mesh model.

11. An image processing method, comprising:
extracting a body area from a color image based on a depth value of a depth image;
matching a boundary of the extracted body area and a boundary of a generic body mesh model; and
deforming a mesh of the generic body mesh model based on a depth value of a pixel positioned within the boundary of the extracted body area.

12. The method of claim 11, wherein the extracting comprises:
extracting a temporary body area from the color image based on the depth value of the depth image;
classifying the temporary body area into a foreground area, a background area, and an uncertain area based on the depth value; and
determining and reclassifying a pixel included in the uncertain area as a pixel included in one of the foreground area and the background area, based on a color value of the color image.

13. The method of claim 11, wherein the extracting comprises:
extracting a temporary body area from the color image based on the depth value of the depth image;
in the case of setting, as a neck, a point at which a horizontal length corresponding to a width of the temporary body area is absolutely short or is relatively shorter than an upper portion or a lower portion thereof,
estimating, as a head, an area corresponding to an upper portion of the neck;
obtaining a first boundary between the hand and an arm based on a color value difference of the color image, and estimating, as a hand, an end based on the first boundary;
obtaining a second boundary between a leg and the foot based on a color value difference of the color image, and estimating, as a foot, an end based on the second boundary; and
extracting, as the body area, an area in which the area estimated as the head, the area estimated as the hand, and the area estimated as the foot are removed from the temporary body area.

14. The method of claim 13, wherein:
the extracting further comprises:
extracting, as a feature point, at least one of both end points of the area estimated as the neck, both end points of the first boundary, both end points of the second boundary, and points of an armpit portion, and
the matching comprises performing matching using the extracted feature point.

15. The method of claim 11, wherein the matching comprises:
generating a two-dimensional (2D) body mesh model by projecting the generic body mesh model; and
matching points of the 2D body mesh model to the boundary of the extracted body area while maintaining topology between the points of the 2D body mesh model.

16. The method of claim 15, wherein the matching of the points comprises matching a feature point extracted from the boundary of the extracted body area and a feature point of the 2D body mesh model.

17. The method of claim 11, wherein the deforming comprises matching a depth value within the boundary of the extracted body area and vertices of a 2D body mesh model, and deforming a mesh of the 2D body mesh model.

18. The method of claim 17, wherein the deforming comprises deforming the mesh of the 2D body mesh model while maintaining topology between vertices of the 2D body mesh model.

* * * * *